Oct. 20, 1959 J. B. OTTESTAD ET AL 2,909,057
AERODYNAMIC HEATING AND LOADING SIMULATOR
Filed Feb. 25, 1957 3 Sheets-Sheet 2

INVENTORS
JACK B. OTTESTAD,
WESTON D. AYERS,
BY SAMUEL A. SKEEN &
JOHN J. KAVANAUGH

ATTORNEY

INVENTORS
JACK B. OTTESTAD,
WESTON D. AYERS,
SAMUEL A. SKEEN &
JOHN J. KAVANAUGH
BY
*[signature]*
ATTORNEY United States Patent Office 2,909,057
Patented Oct. 20, 1959

2,909,057

AERODYNAMIC HEATING AND LOADING SIMULATOR

Jack B. Ottestad, Claremont, and Weston D. Ayers and Samuel A. Skeen, Jr., West Covina, and John J. Kavanaugh, Covina, Calif., assignors to General Dynamics Corporation, San Diego, Calif., a corporation of Delaware Application February 25, 1957, Serial No. 642,024

8 Claims. (Cl. 73—15.6)

This invention relates to aerodynamic heat simulators and more particularly to apparatus for simulating the heating and loading of specimens that as nearly as possible reflect the actual conditions to which the tested material will be subjected in flight.

Heretofore static testing, such as vibration, tension compression, shock, and shearing tests, had been done under normal conditions of temperature. However, the results of these tests are of little value for materials which are to be subjected to high temperatures such as are presently being encountered in supersonic flight speeds of modern airplanes, guided missiles and outer space rockets. Thermal stresses, distortion and rigidity are now of equal importance in high temperature design problems as conventional static testing under normal conditions of temperature. The optimum arrangement therefore is one in which material physical properties can be determined under time and temperature conditions simulating those under which the test material would be subjected, as under simulated flight conditions. Because of the high heat transfer rates that exist during the transient phase of supersonic flight it becomes quite difficult to supply power to a specimen at the rate required. Therefore, a stored energy apparatus has been developed whereby energy, in this case heat, could be accumulated over a relatively long period of time and a portion of this energy used at a high rate for a short time.

It is therefore an object of this invention to provide for apparatus for heating and loading of specimens to simulate conditions encountered in actual flight.

A further object is the provision of apparatus for accumulating and storing heat energy over a relatively long period of time for application to a specimen under a materials test at a high rate and for a short time.

Another object is the provision of simulated heating of a test specimen through a fluid medium in which heating rate in controlled by fluid velocity.

Another object is the provision of simulated heating of a test specimen through a fluid medium of high specific heat, permitting storage of a large amount of heat in a relatively small space.

Still another object is the provision of a load cell in a heat simulator for static testing of a specimen under controlled temperature conditions.

Other objects and features of the present invention will be readily apparent to those skilled in the art from the following specification and appended drawings wherein is illustrated a preferred form of the invention, and in which.

Figure 1:
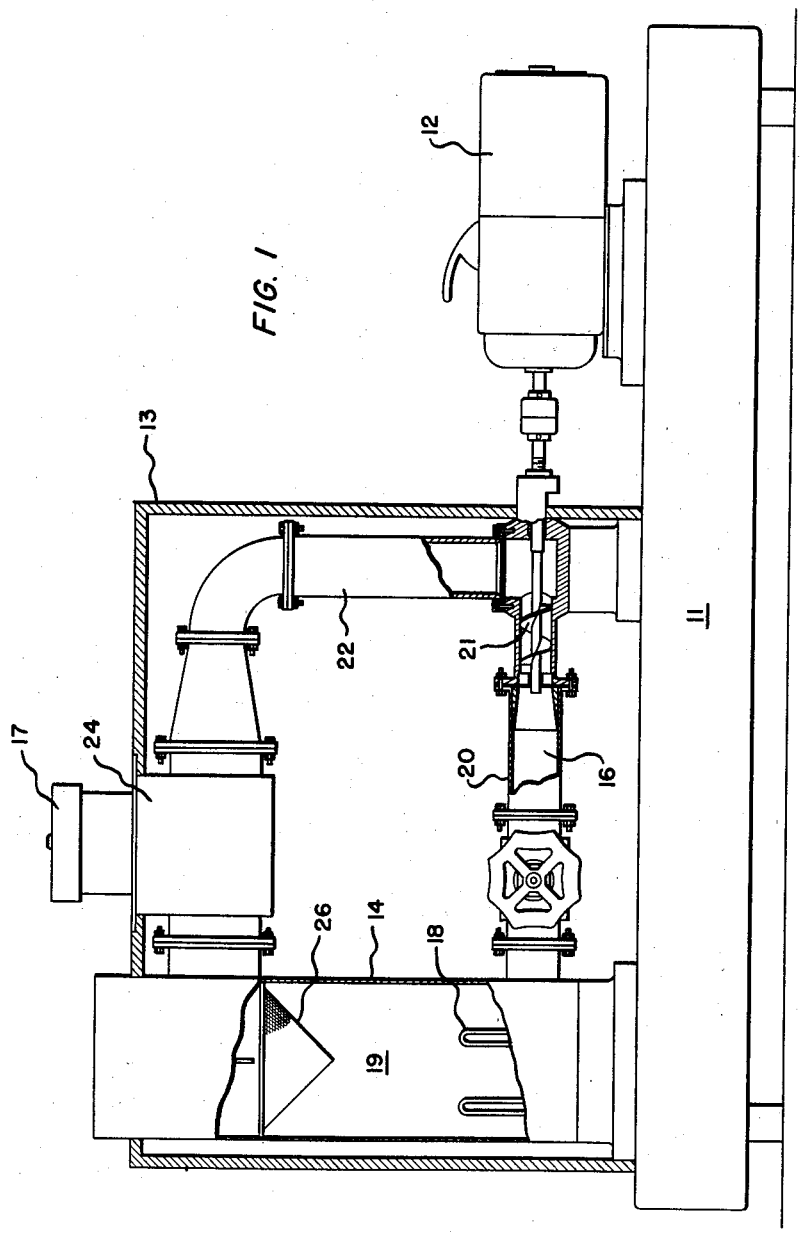
Figure 1 is a diagrammatic view of the heat simulator apparatus and load cell.

Referring now to Figure 1 there is shown a recirculating oil bath system for simulating aerodynamic heating of small missile components and material test specimens in the 180° to 700° F. range and for testing these components in this condition as desired. Mounted on base 11 is a variable speed electric drive motor 12 and a cabinet 13 in which is housed an oil reservoir 14 and an oil flow path through the test chamber 24. The oil is heated by three 3-kilowatt calrod immersion heating elements 18 at the bottom of the reservoir. The heat transfer fluid 19, which may be a petroleum or silicon base oil, flows through conduit 20 to a two inch diameter screw type pump 21 which is driven by the variable speed motor 12. This pump 21 is used to circulate the oil at rates up to 100 gallons per minute through conduit 22, through the test chamber 24 containing the test specimen and back to the reservoir at the top where it is filtered by filter 26. In conduction heating the rate of heat transfer is directly proportional to the velocity of the heat fluid medium. For example, if the fluid flow is 3 feet per second it takes ten seconds to bring the test coupon up to within 10% of the fluid temperature. Fluid flowing at 6 feet per second brings the specimen to within 10% of the fluid temperature in 5 seconds, and fluid flowing at 12 feet per second brings the specimen temperature to within 10% of the fluid temperature within 2½ seconds.

Figure 2:
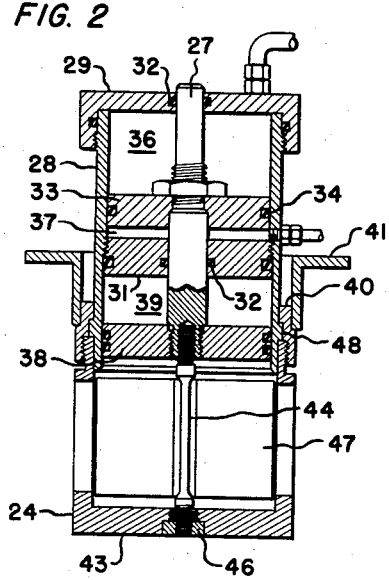
Figure 2 is a cross-sectional view of the test cell in testing a round tensile specimen.
Figure 3:
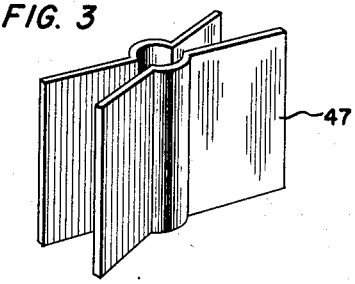
Figure 3 is a perspective view of baffle plates which may be used.

The load cell 17 is basically a double-acting hydraulic cylinder to which various supporting fixtures may be attached in the test chamber 24. The load cell is best shown in Figure 2 set up for a round tensile coupon test arrangement. Here a piston rod 27 is mounted for movement within the hydraulic cylinder 28, the top and bottom portions 29 and 31 of which do not move but which contain suitable non-leaking bearing seals 32 to permit passage of the piston rod therethrough. A load piston 33 and associated oil seal 34 is mounted on piston rod 27 for vertical movement and separates upper compartment 36 from lower compartment 37. Suitable openings and connections are provided in each compartment for connection with a hydraulic pressure source, not shown, for moving the load piston rod 27 at the rate and under the pressure desired by the operator. Attached at the bottom of piston rod 27 and below the bottom 31 of the cylinder 28 is a seal piston 38 which provides for a dead air space 39. This air space isolates the cylinder chambers 36 and 37 from the heated oil below and also cushions the upward movement of the piston rod when the test specimen breaks under tension. Below the seal piston 38 is a test chamber 24 into which are inserted the test specimens. The test cell has a collar 41 mounted thereon for fitting around the opening in the top of the cabinet 13 for support. The test chamber is an open circular section having a base 43 upon which test materials and specimens are mounted. As shown in Figure 2 a round tensile specimen 44 is threadedly engaged in the end of piston rod 27 and at its other end to a retaining nut 46 in base 43. Baffle plates 47, such as shown in Figure 3, direct the flow of fluid around the specimen and out of the chamber. On the outer surface of the hydraulic cylinder 28 near the bottom end is an outwardly projecting ring 48 against which the top portion of the test chamber 24 abuts. The top portion of the test chamber is threaded externally and is threadedly engaged with the lower end of collar 41 which is threaded internally. Collar 41 has an inwardly projecting ring 40 which abuts the top of ring 48 while the top edge of the test chamber 24 abuts the bottom of ring 48. By rotation of collar 41 the test chamber may become firmly attached or disengaged with the hydraulic chamber.

Figure 4:
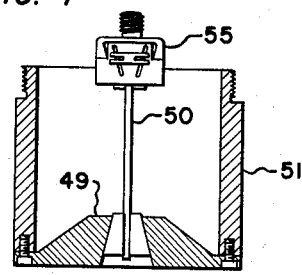
Figure 4 is a perspective view showing the flat tensile test arrangement.
Figure 5:
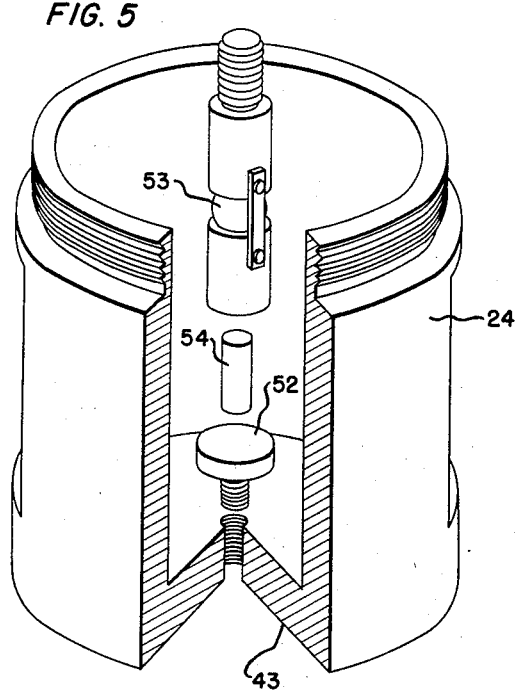
Figure 5 is an exploded view of the compression or bearing test arrangement with a compression test specimen.
Figure 6:
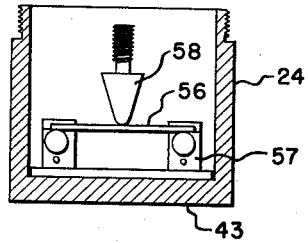
Figure 6 is a cross-sectional view showing a flexure test arrangement.
Figure 7:
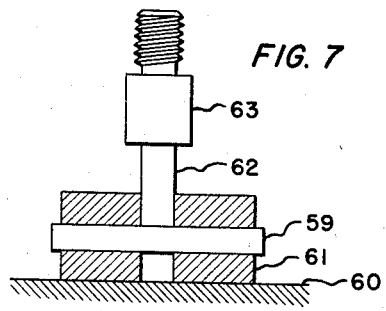
Figure 7 is a cross-sectional view of the block shear test components.

Figure 4 shows a flat tensile test arrangement wherein a flat specimen 50 is gripped by a pair of lower jaws and retaining plate 49 fastened to the bottom edge of walls 51. The top end of flat specimen 50 is gripped in a Templin grip 55 threadedly engageable with the lower end of piston rod 27. Both ends of specimen 50 are thus gripped in such a manner that the more tension is applied to the specimen the tighter is the grip on the edges of the specimen. The test chamber 24 in Figure 5 is of the same type as the one used in Figure 2. However instead of a retaining nut in the base, a lower anvil 52 is threadedly engaged therewith. Threadedly engageable with the piston rod 27 is a load block and hemispherical seat 53 for exerting a downward force on compression specimen 54 positioned on anvil 52. The test apparatus is the same for a bearing test although the specimen is usually shorter in the bearing test. Figure 6 is a cross-sectional view of the test chamber 24 showing the flexure test arrangement. Here a flexure specimen 56 is shown mounted on beam end supports 57 at each end. A downward force member 58 contacts the flexure specimen 56 in the middle thereof. This member 58 is adapted to be threadedly engaged with the lower end of the piston rod 27. Figure 7 shows the block shear test components. A test specimen 59 is inserted in a horizontal aperture in test block 61 on a base support 60. A shear plunger 62 is inserted in an opening in the top of block 61. Load head 63 is threadedly engageable with piston rod 27 and exerts the downward force to the plunger 62. In all of the testing arrangements it should be noted that the test cell and test components are compact, simple and rigidly built and therefore there are few overall deflection variables. Thus overall deformation may be used to obtain yield. This deformation of the specimen may be measured by movement of the piston rod relative to the cylinder. The remaining portions of the test machine for applying the proper loads to the piston consist of various mechanical, hydraulic and electrical devices to facilitate testing and to obtain accurate results. Three different methods are being used to govern the flow of hydraulic fluid to activate the load piston. One is a manual system whereby the flow rate is regulated by the operator with a conventional needle valve. Another is a constant velocity control method in which the velocity of the load cell piston is kept constant regardless of load requirements. This method employs a servo valve, amplifier and feedback. The velocity is controllable throughout the range of .001" per minute to 1.00" per minute. The third is a constant load method in which the load is applied to the specimen at the desired time in a time period less than .25 second and then maintained at that level as long as desired. Since the piston actuating fluid pressure source is of conventional design and of the type widely used in the testing art, further description thereof is not deemed to be necessary.

Figure 8:
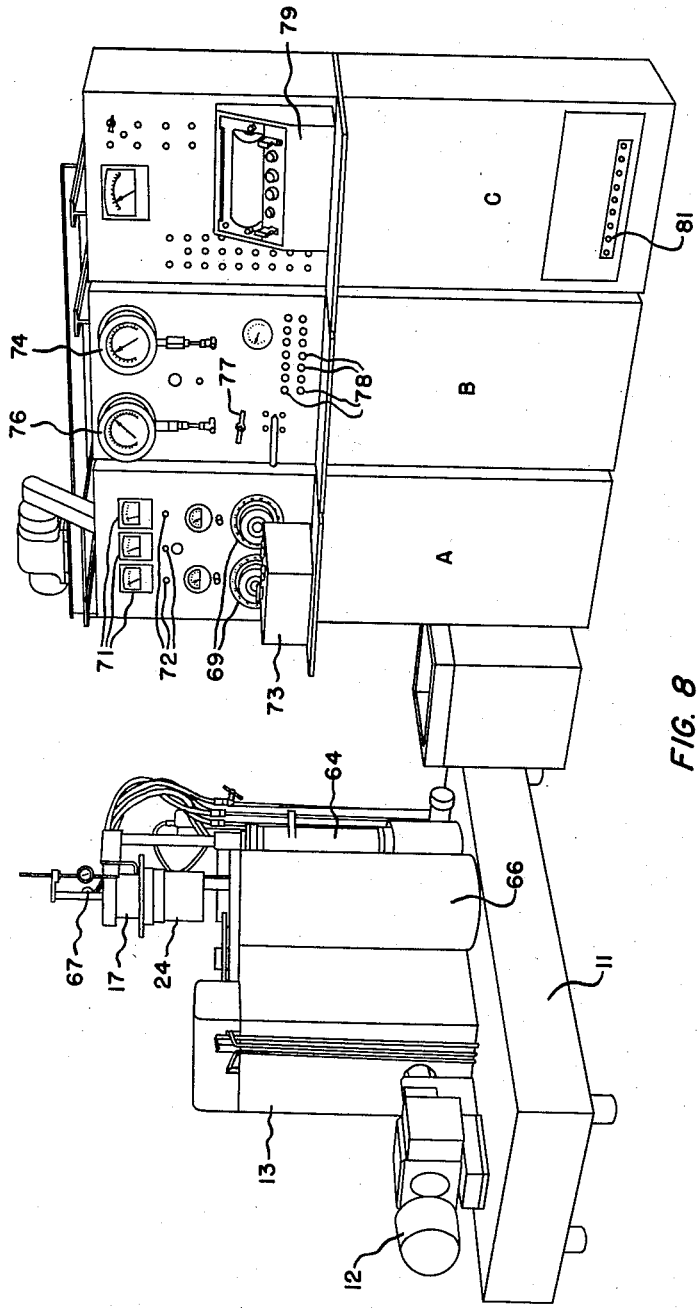
Figure 8 is a perspective view of the test unit and control panel.

Reference is now made to Figure 8 wherein is shown a perspective view of the test unit and control panel. The hydraulic pressure source is not shown. The test unit on the left is represented by base 11, pump motor 12, housing 13, load cell and test chamber 17, 24, supporting arbor 64 for moving the cell from a cooling tank 66 to the test section in the heated fluid path. Various thermocouples, not shown, are used for measuring bath temperature, inlet oil temperature, heating element temperature, and specimen temperature as desired. A ring gauge 67 is used to sense the load cell piston movement. Deflection can be measured to within .00001". A differenntial pressure transducer is used to sense the net pressure in the load cell to ±1#. The heating element control panel A includes Variacs 69 to control the input to the heating elements 18 in the reservoir. Ammeters 71 read heating element current and indicator lights 72 designate which elements are being heated. A thermocouple recorder 73 records the various temperatures. In the specimen loading control panel B there is shown a pump source pressure gauge 74, a load cell pressure indicator 76, a load cell pressure control 77, and numerous switches 78 to control the rotation and vertical motion of the load cell and test body in movement between the test section and cooling tank 66. The test machine is so designed that the only manual operation is in installing and removing the test specimen. Switches 78 open and close the cover to the test chamber, raise and lower the arbor 64 which supports the load cell, rotates the arbor to either test or cool position and turns the pump and heaters on or off together. The instrumentation panel C contains its own amplifier and power source 81 for instrumentation and suitable recording apparatus 79.

*Operation*

A typical simplified testing sequence is started by turning power on to heat the heating elements and starting the pump to circulate the bath fluid slowly. The temperature is allowed to build up slowly and the same is noted on the thermocouple recorder. When the bath has reached the required temperature and the specimen has been mounted in the load cell, the pump is shut off, the test section lid is removed, the load cell is swung over the test section opening and lowered into the hot bath. The pump is again started to circulate the hot fluid and a load is applied to the specimen through the hydraulic actuated piston. While the specimen is being loaded the displacement of the piston is measured by the ring gauge and the pressure is being measured by a pressure pickup. Both readings are recorded on the recorder. The temperature is noted on the thermocouple recorder. The specimen is continuously loaded until it fails. Then the pump is stopped, the load cell removed from the test section and placed in the cooling bath in the cooling tank. When sufficiently cool the specimen is then removed.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. In a heating and loading apparatus for testing specimens under environmental conditions, a load cell comprising a cylinder having a top and a bottom defining a piston chamber, a load piston therein adapted for movement within said chamber, said cylinder having walls extending below said bottom, a seal piston connected to said load piston and adapted to move within said cylinder walls below said bottom, said bottom and said seal piston defining a dead air space to insulate said piston chamber from heat and to cushion sudden piston movement, a test chamber, means for mounting a test specimen within said test chamber, and means for transmitting piston movement to said test specimen.

2. In a heating and loading apparatus as in claim 1, an annular outwardly extending ring near the lower end of said cylinder, said test chamber adapted to abut thereagainst along the lower edge thereof, a collar member having outwardly extending flanges to support said load cell and test chamber, said collar member having an annular inwardly extending ring adapted to abut the upper edge of said outwardly extending ring, said collar member and said test chamber being threadedly engageable to securely maintain said load cell and said test chamber in locked relation.

3. In a heating and loading apparatus as in claim 1, said means for transmitting piston movement to said test specimen comprising a threaded recess in the lower end of said piston for threadedly receiving one end of said test specimen and means in the bottom of said test chamber for threadedly receiving the other end of said specimen.

4. In a heating and loading apparatus as in claim 1, said means for transmitting piston movement to said test specimen comprising means threadedly engageable with said piston and frictionally engageable with said specimen at one end thereof, and means frictionally connecting said specimen at the other end thereof to the bottom of said test chamber.

5. In a heating and loading apparatus as in claim 1, said means for transmitting piston movement to said test specimen comprising means threadedly engageable with said piston and engageable with said specimen, and positioning means on the bottom of said test chamber for positioning said specimen in desired alignment with said threadedly engageable means.

6. In a heating and loading apparatus for testing specimens under environmental conditions, a load cell comprising a cylinder having a top and a bottom defining a piston chamber, a load piston therein adapted for axial movement within said chamber, said piston being actuated by hydraulic means in a predetermined manner, said cylinder having walls extending below said bottom, a seal piston connected to said load piston and adapted to move axially within said cylinder walls below said bottom, said bottom and said seal piston defining a dead air space to insulate said piston chamber from heat therebelow and to cushion sudden piston movement, a test chamber attached to said load cell, means for mounting a test specimen within said test chamber, means for transmitting piston movement to said test specimen, and suitable openings in said test chamber for circulating heat transmitting fluid around said specimen.

7. In a heating and loading apparatus for testing specimens under environmental conditions, a load cell comprising a cylinder having a top and a bottom defining a piston chamber, a load piston therein adapted for movement within said chamber, said cylinder having walls extending below said bottom, a seal piston connected to said load piston and adapted to move within said cylinder walls below said bottom, said bottom and said seal piston defining a dead air space to insulate said piston chamber from heat therebelow and to cushion sudden piston movement, a test chamber attached to said load cell, means for mounting a test specimen within said test chamber, means for transmitting piston movement to said test specimen.

8. In a heating and loading apparatus for testing specimens under environmental conditions, a load cell comprising a cylinder having a top and a bottom defining a piston chamber, a load piston therein adapted for axial movement within said chamber, said cylinder having walls extending below said bottom, a seal piston connected to said load piston and adapted to move axially within said cylinder walls below said bottom, said bottom and said seal piston defining a dead air space to insulate said piston chamber from heat therebelow and to cushion sudden piston movement, a test chamber attached to said load cell, means for mounting a test specimen within said test chamber, means for transmitting piston movement to said test specimen, and suitable openings in said test chamber for circulating heat transmitting fluid around said specimen.

References Cited in the file of this patent

UNITED STATES PATENTS

| | | |
|---|---|---|
| 2,245,269 | Gilbert | June 10, 1941 |
| 2,399,404 | Summers | Apr. 30, 1946 |
| 2,479,984 | Stock | Aug. 23, 1949 |
| 2,518,217 | Beck et al. | Aug. 8, 1950 |
| 2,576,433 | Wood | Nov. 27, 1951 |
| 2,699,060 | Safford | Jan. 11, 1955 |
| 2,763,149 | Long et al. | Sept. 18, 1956 |

FOREIGN PATENTS

| | | |
|---|---|---|
| 622,323 | Germany | Nov. 26, 1935 |